(12) United States Patent
Shiojima et al.

(10) Patent No.: US 9,774,937 B2
(45) Date of Patent: Sep. 26, 2017

(54) SPEAKER UNIT

(71) Applicant: YAMAHA CORPORATION, Hamamatsu-shi, Shizuoka-ken (JP)

(72) Inventors: Hiroyuki Shiojima, Hamamatsu (JP); Kazuya Atsumi, Hamamatsu (JP); Katsutoki Hanayama, Hamamatsu (JP); Satoshi Hayakawa, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/009,035

(22) Filed: Jan. 28, 2016

(65) Prior Publication Data

US 2016/0227307 A1 Aug. 4, 2016

(30) Foreign Application Priority Data

Jan. 30, 2015 (JP) .................................. 2015-017993

(51) Int. Cl.
*H04R 1/02* (2006.01)
*F16B 13/04* (2006.01)

(52) U.S. Cl.
CPC ............. *H04R 1/026* (2013.01); *H04R 1/025* (2013.01); *F16B 13/04* (2013.01); *H04R 2201/021* (2013.01)

(58) Field of Classification Search
CPC .. H04R 1/025; H04R 1/026; H04R 2201/021; F16B 13/04
See application file for complete search history.

(56) References Cited

U.S. PATENT DOCUMENTS

| 4,546,850 A | 10/1985 | Litner |
| 5,931,432 A | 8/1999 | Herold et al. |
| 2011/0180678 A1 | 7/2011 | Liu |

(Continued)

FOREIGN PATENT DOCUMENTS

| EP | 2675184 A1 | 12/2013 |
| JP | 2014017810 A | 1/2014 |

OTHER PUBLICATIONS

Extended European Search Report issued in European Appln. No. 16153058.9 mailed Jun. 8, 2016.

(Continued)

*Primary Examiner* — Andrew L Sniezek
(74) *Attorney, Agent, or Firm* — Rossi, Kimms & McDowell LLP

(57) ABSTRACT

Disclosed is a speaker unit which includes a speaker surface provided in a bottom surface of a cabinet section and a provisionally fastening mechanism provided on a side surface of the cabinet section. The provisionally fastening mechanism includes: an engagement section for provisionally fastening the speaker unit to the mounting part; an operating section exposed on a face side of a mounting part with the speaker unit provisionally fastened via the engagement section; and a non-shielded portion formed adjacent to the outer periphery of the speaker surface for allowing the operating section to be visible from a face side of the speaker surface. The non-shielded portion is an opening or a recess formed in a flange section projecting radially outward from the outer peripheral edge of the bottom surface of the cabinet section.

8 Claims, 8 Drawing Sheets

(56) References Cited

U.S. PATENT DOCUMENTS

2013/0327586 A1    12/2013   Tanaka et al.
2014/0305734 A1*  10/2014   Ivey ...................... H04R 1/025
                                                              181/150

OTHER PUBLICATIONS

Extended European Search Report issued in European Appln. No. 16153059.7 mailed Jun. 8, 2016.
Office Action issued in U.S. Appl. No. 15/008,954 mailed Feb. 8, 2017.

\* cited by examiner

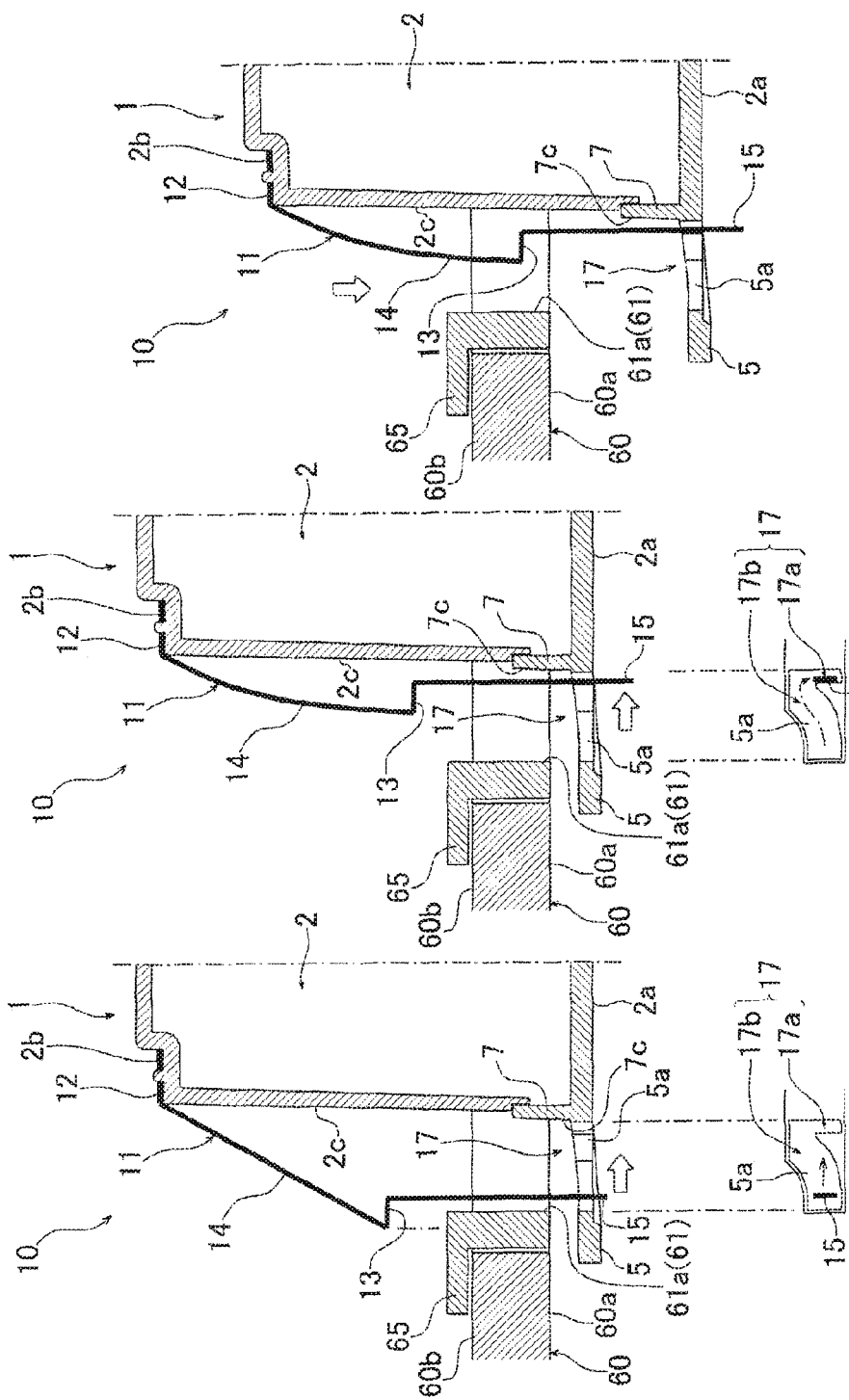

SPEAKER UNIT

BACKGROUND

The present invention relation to embedded type speaker units mountable by being embedded in an opening section formed in a mounting part, such as a ceiling or side wall.

There have heretofore been known embedded type speaker units (such as ceiling speakers) that are installed or mounted by being embedded in an opening section formed in a ceiling or the like of a room, as disclosed for example in Japanese Patent Application Laid-open Publication No. 2014-017810 (hereinafter referred to as "the relevant patent literature"). Generally, such speaker units include a cabinet section of a substantially cylindrical shape, and a speaker face provided in the bottom surface of the cabinet section. To mount the speaker unit to a ceiling, for example, the cabinet section is inserted into a mounting hole (opening section) of the ceiling with the speaker face exposed on the face (i.e., lower surface) of the ceiling, and then the inserted cabinet section is fixed or fastened to the ceiling by fastening via bolts or the like. A mounting structure for such a speaker unit includes a provisionally fastening mechanism for preventing the heavy speaker unit from falling down accidentally or by mistake before the fastening via the bolts or the like or after cancellation of the fastening, as disclosed in the relevant patent literature.

When the speaker unit is to be dismounted from the opening section of a ceiling or the like for maintenance or replacement purpose, there arises a need to cancel the provisional fastening, with respect to the mounting hole, of all of the provisionally fastening mechanisms. However, with the provisional fastening mechanisms disclosed in the relevant patent literature, each of which is constructed to be operated laterally from a side-surface side, not from a speaker-surface side (i.e., face side), a human operator cannot view the provisional fastening mechanism from the speaker-surface side. Thus, at the time of maintenance, for example, the human operator has to grope for (i.e., feel for or find with a hand alone) the position of the speaker-surface side, so that operation for canceling the provisional fastening would undesirably take much time and labor. Further, to dismount the speaker unit from the provisionally fastened position, the human operator has to cancel the provisional fastening of the speaker unit by inserting, from a lateral side, his or her finger into a gap between the speaker unit and the ceiling. However, if the ceiling plate has a great thickness, the finger cannot be inserted deep enough into the gap between the speaker unit and the ceiling because the gap is too narrow even in the provisionally fastened state, which would result in the problem that manipulation or operation of the provisional fastening mechanism is difficult to perform.

SUMMARY OF THE INVENTION

In view of the foregoing prior art problems, it is an object of the present invention to provide an improved speaker unit which can be efficiently mounted and dismounted to and from a mounting part and yet is simple in construction.

Note that the same reference numerals as used for various constituent elements of later-described embodiments of the present invention are indicated in parentheses here for ease of understanding.

In order to accomplish the above-mentioned object, the present invention provides an improved speaker unit (1) for mounting to an opening section (61) formed in a mounting part (60), comprising: a cabinet section (2) having a side surface (2c) and a bottom surface (2a); a speaker surface (4) provided in the bottom surface (2a) of the cabinet section (2); and a provisionally fastening mechanism (10) provided on the side surface (2c) of the cabinet section (2) and configured to provisionally fasten the speaker unit (1) to the mounting part (60) with at least a portion of the cabinet section (2) inserted in the opening section (61) from a face side of the mounting part (60), the provisionally fastening mechanism (10) including: an engagement section (13) configured to provisionally fasten the speaker unit (1) to the mounting part (60); an operating section (15) exposed on the face side of the mounting part (60) with the speaker unit (1) provisionally fastened to the mounting part (60) via the engagement section (13); and a non-shielded portion (5a) formed adjacent to the outer periphery of the speaker surface (4) for allowing the operating section (15) to be visible from a face side of the speaker surface (4).

Because the non-shielded portion is formed adjacent to the outer periphery of the speaker surface, the operating section is visible from the face side of the speaker surface through the non-shielded portion. Thus, when the speaker unit is to be mounted or dismounted to or from the mounting part, the human operator can manipulate or operate the operating section while viewing the provisionally fastening mechanism from the face side of the speaker surface. In this way, there is no need for the human operator to grope for (feel for) the position of the provisionally fastening mechanism when mounting or dismounting the speaker unit to or from the mounting part, and thus, the human operator can easily cancel the provisional fastening of the speaker unit. Further, when the speaker unit is to be dismounted from the mounting part, the human operator can access the operating section through the non-shielded portion and thus can directly operate the operating section from the face side of the speaker surface. In this manner, the human operator can operate the operating section reliably irrespective of the thickness of the mounting part, and thus, the speaker unit can be mounted and dismounted to and from the mounting part.

In an embodiment of the invention, the operating section (15) projects to the face side beyond the speaker surface (4). With the operating section projecting to the face side beyond the speaker surface, the human operator can operate the operating section with an increased ease.

Further, in an embodiment of the invention, the operating section (15) is disposed retracted from the speaker surface (4) in a direction toward the reverse side without projecting to the face side beyond the speaker surface. With the operating section disposed retracted from the speaker surface without projecting to the face side beyond the speaker surface like this, a degree of structural and design freedom of elements around the speaker surface can be enhanced.

Further, in an embodiment of the invention, the non-shielded portion (5a) is a retention section (17) that retains the operating section (15), the engagement section (13) is movable between an engagement position in which the engagement section (13) engages with the mounting part (60) and a cancellation position in which the engagement section (13) cancels engagement with the mounting part (60) by being retracted from the mounting part (60), and the retention section (17) retains the operating section (15) in the cancellation position of the engagement section (13). Because the engagement section can be retained in the cancellation position by the retention section provided in the provisionally fastening mechanism, the operation for provisionally fastening the speaker unit and canceling the provisional fastening of the speaker unit at the time of mounting and dismounting of the speaker unit to and from the mounting part can be performed with an increased ease.

Further, in an embodiment of the invention, the retention section (17) has a retention groove (17a) configured to retain the operating section (15) when the engagement section (13) is in the cancellation position, and a guide groove (17b) communicating with the retention groove (17a) and configured to guide movement of the operating section (15) when the engagement section (13) moves from the engagement position to the cancellation position. With such arrangements, the engagement section can be directed smoothly to the cancellation position, so that dismounting of the speaker unit from the mounting part can be performed with an increased ease.

Furthermore, in an embodiment of the invention, the guide groove (17b) has a slant surface (17b1) for gradually displacing a direction of movement, along the guide groove (17b), of the operating section (15), and the retention groove (17a) extends from an end of the slant surface (17b1) in a direction across or traversing the movement direction of the operating section (15). Because the retention groove extends from the end of the slant surface in the direction traversing the movement direction, along the guide groove, of the operating section, the operating section (15) is directed, from the end of the guide surface, generally perpendicularly into the retention section, and then the operating section, having so far been laterally displaced by the slant surface, returns to its normal posture and is reliably retained in the retention groove. Thus, as the engagement section is moved from the engagement position to the cancellation position, the operating section can be readily and reliably directed along the guide groove into the retention groove that can reliably retain the engagement section. In this way, the operation for dismounting the speaker unit from the mounting part can be performed even more efficiently and reliably.

The following will describe embodiments of the present invention, but it should be appreciated that the present invention is not limited to the described embodiments and various modifications of the invention are possible without departing from the basic principles. The scope of the present invention is therefore to be determined solely by the appended claims

BRIEF DESCRIPTION OF THE DRAWINGS

Certain preferred embodiments of the present invention will hereinafter be described in detail, by way of example only, with reference to the accompanying drawings, in which:

FIGS. 3A to 3C show the speaker unit provisionally fastened to the mounting part, of which FIG. 3A is a side sectional view showing the speaker unit provisionally fastened to the mounting hole of the mounting part, FIG. 3B is a side view as viewed in a direction of arrow X of FIG. 3A, and FIG. 3C is a front view as viewed in a direction of arrow Y of FIG. 3A;

FIGS. 4A to 4D are perspective views of the provisionally fastening mechanism as viewed from a face side of a flange section, of which FIG. 4A shows a state in which the engagement section is in the engagement position in which it engages with the mounting part, FIG. 4B shows a state in which the operating section has abutted against a slant surface of a guide groove of a retention section, FIG. 4C shows a state in which the operating section has reached a retention groove of the retention section, and FIG. 4D shows a state in which the operating section has been retained by the retention groove with the engagement section placed in the cancellation position in which the engagement section has canceled the engagement with the mounting part by being moved away from the mounting part;

FIGS. 5A to 5C are schematic views explanatory of a construction and behavior of a stopper mechanism, of which FIG. 5A shows a state in which a stopper piece is in an initial position, FIG. 5B shows a state in which the stopper piece has pivoted from the initial position, and FIG. 5C shows a state in which the stopper piece is in a fixed position;

FIGS. 6A to 6C are views showing an operational sequence for dismounting the speaker unit from the mounting part, of which FIG. 6A shows a state in which the engagement section is in the engagement position, FIG. 6B shows a state in which the engagement section is in the cancellation position, and FIG. 6C shows a state in which the cabinet section has been displaced away from the mounting part; and FIGS. 7A to 7C show an operational sequence for mounting the speaker unit to the mounting part, of which FIG. 7A shows a state before a cabinet section of the speaker unit is mounted to the mounting part, FIG. 7B shows a state in which the engagement section is in the cancellation position, and FIG. 7C shows a state in which the engagement section has moved to the engagement position.

DETAILED DESCRIPTION

Figure 1:
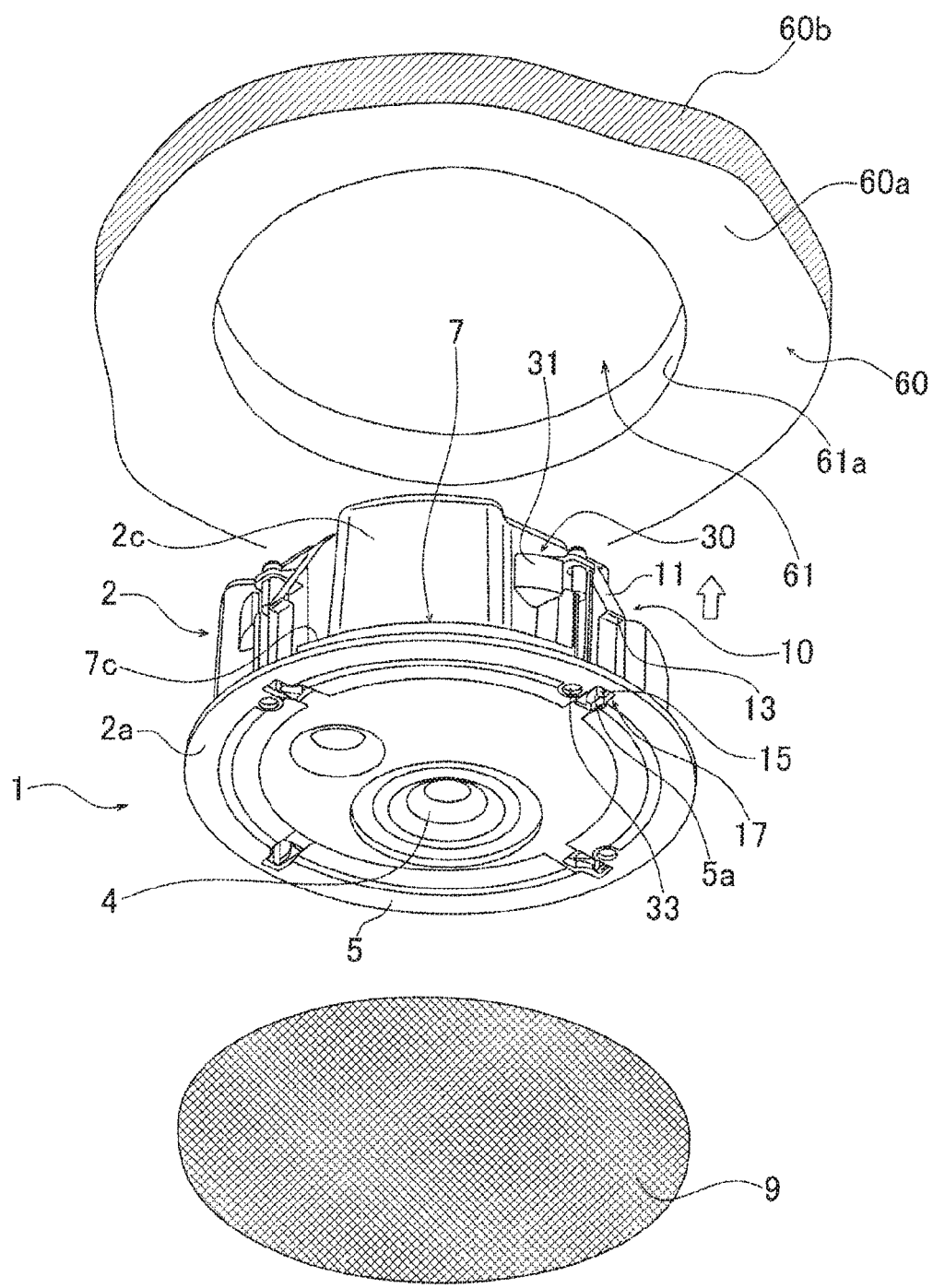
FIG. 1 is a perspective view schematically showing a preferred embodiment of a speaker unit of the present invention along with an example of a mounting hole of a mounted part to which the speaker unit is to be mounted.

The following describe preferred embodiments of the present invention with reference to the accompanying drawings. FIG. 1 is a perspective view schematically showing a preferred embodiment of a speaker unit of the present invention along with an example of a mounting hole in which the speaker unit is to be mounted. In the following description, the term "face side" refers to a side visible from outside a mounting part 60 after the speaker unit 1 is mounted on the mounting part 60 (i.e., outer side of the mounting part 60), while the term "reverse side" refers to a side invisible from outside the mounting part 60 after the speaker unit 1 is mounted on the mounting part 60 (i.e., inner side of the mounting part 60). Further, in the following description, the term "upper" or "upper side" refers to the reverse side of the speaker unit 1, while the term "lower" or "lower side" refers to the face side of the speaker unit 1.

The speaker unit 1 of the present invention is an embedded type speaker unit (ceiling speaker in the illustrated example) installable or mountable by being embedded in the mounting hole (opening section) 61 formed in the mounting part 60 such as a ceiling. The mounting hole 61 of the mounting part 60 is a circular through-hole formed through the mounting part 60 from a face side surface 60a to a reverse side surface 60b of the mounting part 60. The speaker unit 1 comprises: a cabinet section 2 having an outer peripheral side surface 2c and a bottom surface 2a; a speaker face 4 provided in the bottom surface 2a of the cabinet section 2; and a speaker cover 9 attached to the face side of the speaker face 4 to cover the speaker face 4.

A bottom cover 7 is provided to surround the bottom surface 2a of the cabinet section 2 and a part of the outer circumference or periphery of the cabinet section 2 adjoining the bottom surface 2a. More specifically, the bottom cover 7 is an annular member that surrounds and covers the bottom surface 2a of the cabinet section 2 and a part of the outer periphery of the cabinet section 2 immediately above the bottom surface 2a. The outer peripheral surface (outer peripheral edge) 7c has a diameter slightly smaller than that of the inner peripheral edge 61a of the mounting hole 61 but greater than an outer diameter of an upper end portion of the cabinet section 2. Namely, the bottom cover 7 is formed as an annular (ring-shaped) projection projecting radially outward from the bottom surface 2a and the part of the outer periphery of the cabinet section 2 adjoining the bottom surface 2a. Further, the bottom cover 7 is formed and disposed in such a manner that, with the speaker unit 1 installed or mounted in the mounting hole 61, the outer peripheral surface 7c extends along and is opposed to the inner peripheral edge portion 61a of the mounting hole 61 with a slight gap therebetween. In the instant embodiment, the bottom cover 7 is a member formed of synthetic resin, and the cabinet section 2 located upward of the bottom cover 7 is also formed of synthetic resin. Alternatively, only the bottom cover 7 may be formed of synthetic resin, and the cabinet section 2 located above the bottom cover 7 may be formed of metal or any other suitable material.

A flange section 5 of a thin plate shape is formed on the lower end of the bottom cover 7 and projects radially outward from the outer circumferential or peripheral edge of the bottom surface 2a of the cabinet section 2. The flange section 5 is formed as an annular edge portion integral with the bottom cover 7 and having a surface extending radially outward at substantially the same height position as the bottom surface 2a (speaker surface 4) of the cabinet section 2.

The speaker unit 1 further includes a plurality of provisionally fastening mechanisms 10 for temporarily fastening the speaker unit 1 in the mounting hole 61. These provisionally fastening mechanisms 10 are provided on the outer peripheral side surface 2c of the cabinet section 2 for engaging and provisionally fastening the speaker unit 1 to the mounting part 60 with at least a portion of the cabinet section 2 inserted in the mounting hole 61 from the face side of the mounting part 60. Each of the provisionally fastening mechanisms 10 comprises a provisionally fastening tab (resilient member) 11 in the form of a thin resilient metal plate, and a retention section 17. The provisionally fastening tab (resilient provisionally fastening member or piece) 11 has an engagement section 13 formed thereon for provisionally engaging with the mounting part 60, and a distal end portion of the engagement section 13 is formed as an operating section 15 exposed on the face side surface 60a of the mounting part 60 so that the operating section 15 is readily operable manually by a human operator. The engagement section 13 is movable between an engagement position in which it engages with the mounting part 60 and a cancellation position in which it cancels the engagement with the mounting part 60 by being moved away from the mounting part 60. The engagement section 13 is positioned in the engagement position or in the cancellation position by being operated with a hand of a human operator. The retention section 17 is constructed to retain the engagement section 13 in the cancellation position where the provisional fastening engagement by the engagement section 13 is canceled (see FIG. 6B). An example detailed construction of the provisionally fastening mechanism 10 will be discussed later.

Further, stopper mechanisms 30 for fully fixing the speaker cabinet 1 having been provisionally fastened in the mounting hole 61 by means of the provisionally fastening mechanisms 10 are provided on the side surface 2c of the cabinet section 2. Each of the stopper mechanisms 30 includes a stopper piece 31 provided sideways of the cabinet section 2 in such a manner that the stopper piece 31 is movable in the up-down direction. Each of the stopper mechanisms 30 is constructed to fix the speaker unit 1 by sandwiching the inner peripheral edge portion 61a of the mounting hole 61 between the flange section 5 and the stopper piece 31.

Figure 2:
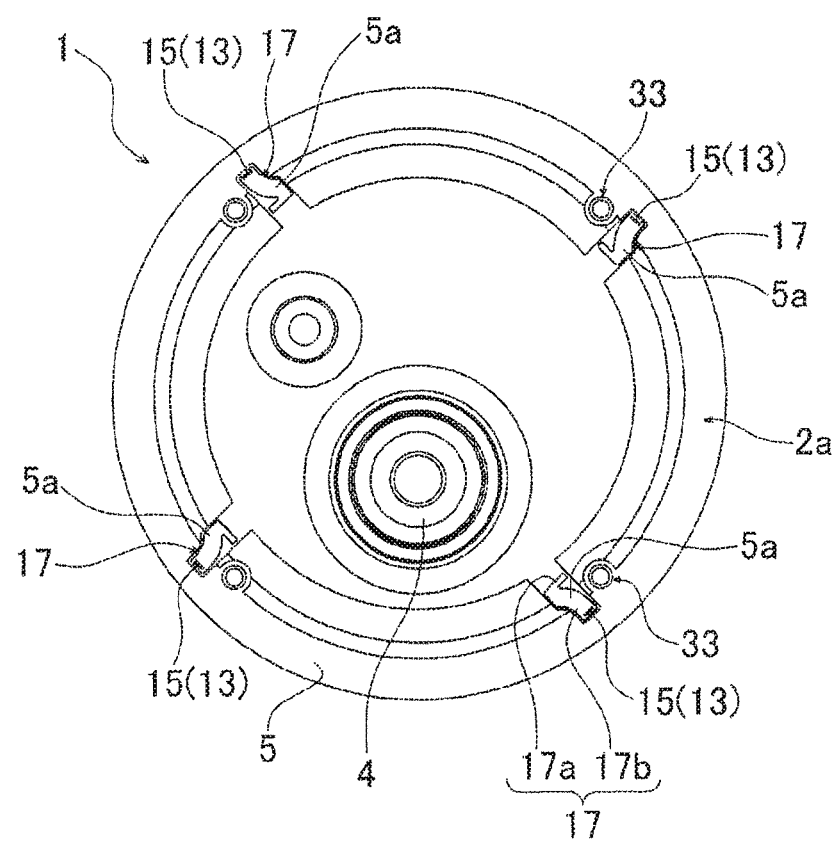
FIG. 2 is a schematic plan view of the speaker unit as viewed from a face side of a speaker surface.

Further, FIG. 2 is a schematic plan view of the speaker unit 1 as viewed from the face side of the speaker surface 4. The face side surface of the speaker unit 1 is the bottom surface 2a of the cabinet section 2, and the flange section 5 is formed along the outer circumference or periphery of the speaker surface 4. The flange section 5 has the retention sections 17 formed in a plurality of positions thereof for retaining the distal-end operating sections 15 of the corresponding engagement sections 13. In the illustrated example, the retention sections 17, which correspond in number and position to the provisionally fastening mechanisms 10, are disposed in four positions of the circumference or periphery of the flange section 5 at equal intervals along the circumference or periphery.

Each of the retention sections 17 is provided in association with an opening portion (non-shielded portion) 5a formed in the flange section 5; for example, the retention section 17 is formed as a peripheral edge of the opening portion 5a. Each of the retention sections 17 comprises a retention groove 17a for retaining the operating section 15, and a guide groove 17b communicating with the retention groove 17a for guiding the movement of the engagement section 13 between the engagement position and the cancellation position. As shown in FIG. 2, the distal-end operating section 15 of the engagement section 13 is visible from the face side of the speaker surface 4 through the opening portion 5a.

In the instant embodiment, as noted above, the opening portions 5a in the form of four holes are formed in the flange section 5 so that the operating section 15 is constructed in an unshielded manner, i.e. in such a manner as to be visible from the face side (underside) of the speaker unit 1. However, the present invention is not so limited as long as the human operator can view the operating sections 15. For example, a continuous ring-shaped opening portion may be formed in and along the entire inner circumference or periphery of the flange section 5 around the speaker surface 4. As another alternative, a plurality of recesses corresponding in number to the provisionally fastening mechanisms 10 may be formed in the circumference or periphery of the flange section 5.

Figures 3A, 3B:
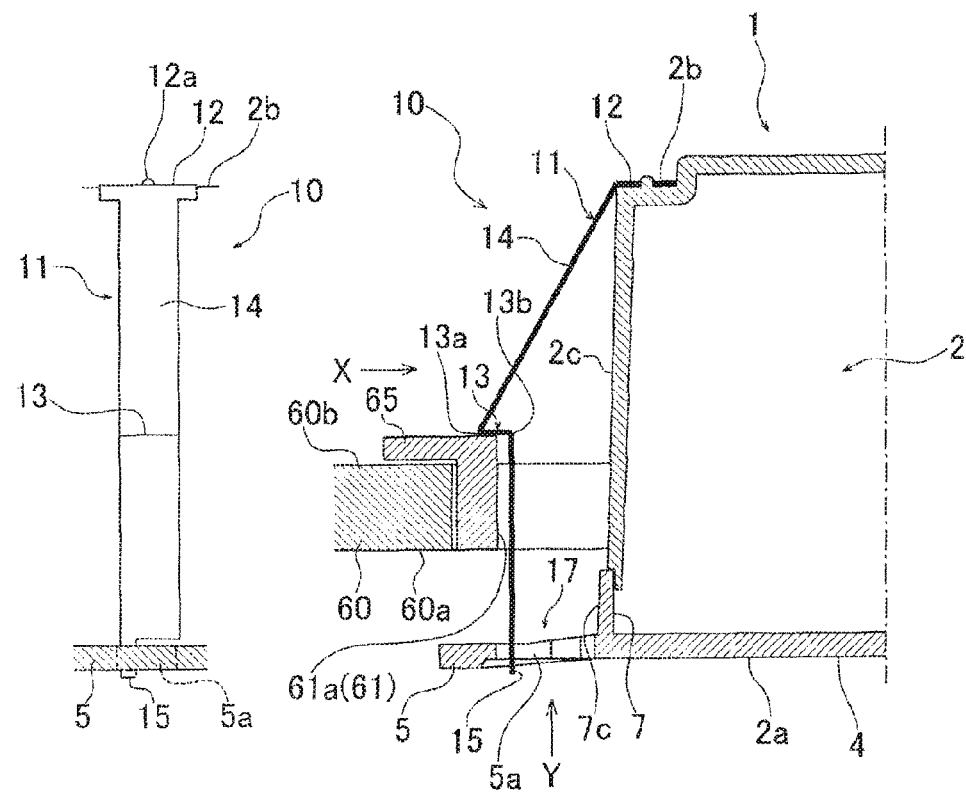
Figure 3C:
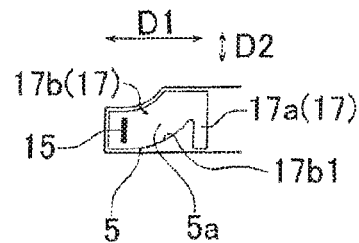

The following describe an example detailed construction of each of the provisionally fastening mechanisms 10. FIGS. 3A to 3C show the speaker unit 1 provisionally fastened to the mounting hole 61 of the mounting part 60, of which FIG. 3A is a side sectional view of the provisionally fastening mechanism 10, FIG. 3B is a side view as viewed in a direction of arrow X of FIG. 3A and FIG. 3C is a plan view as viewed in a direction of arrow Y of FIG. 3A. Note that FIG. 3A shows a vertical sectional view of the provisionally fastening mechanism 10 taken at the position of the engagement section 13, and that only the outline of the cabinet section 2 is shown in these figures with a construction inside the cabinet section 2 omitted for simplicity.

As shown in FIGS. 3A and 3B, each of the provisionally fastening mechanisms 10 includes the elongated provisionally fastening tab (resilient member) 11 fixed at one end (or upper end) portion to the upper surface 2b of the cabinet section 2 and having an intermediate portion bent to project toward the outer peripheral side surface 2c so as to provide the engagement section 13. Another end (or lower end) portion, opposite the one end portion, of the provisionally fastening tab 11 is constructed as the operating section 15 operable manually with a human operator's hand. Namely, the provisionally fastening tab 11 includes: a mounting portion 12 for being fastened to the upper surface 2b of the cabinet section 2 by means of a screw 12a; the engagement section 13 of a stepped shape for engaging with the inner peripheral edge portion 61a of the mounting hole 61 of the mounting part 60; a slant portion 14 extending obliquely downward from the mounting portion 12 toward the bottom surface 2a from the mounting portion 12 and radially outward away from the cabinet section 2; and the operating section 15 extending vertically downward from the inner end 13b of the engagement section 13 toward the bottom surface 2a of the cabinet section 2. Note that, in the instant embodiment, the engagement section 13 engages with the reverse side surface 60b of the mounting part 60 via an attachment member 65, attached to the inner peripheral edge portion 61a of the mounting hole 61, instead of directly engaging with the reverse side surface 60b. Further, whereas, in the instant embodiment, the provisionally fastening tab 11 is fastened to the upper surface 2b of the cabinet section 2, the present invention is not so limited, and the provisionally fastening tab 11 may be fastened to the outer peripheral side surface 2c of the cabinet section 2. Furthermore, whereas, in the instant embodiment, the provisionally fastening tab 11 is fastened to the cabinet 2 by means of the screw 12a, the present invention is not so limited, and the provisionally fastening tab 11 may be fastened to the cabinet 2 by means of a rivet, adhesive joining, welding or the like.

Figures 8A, 8B:
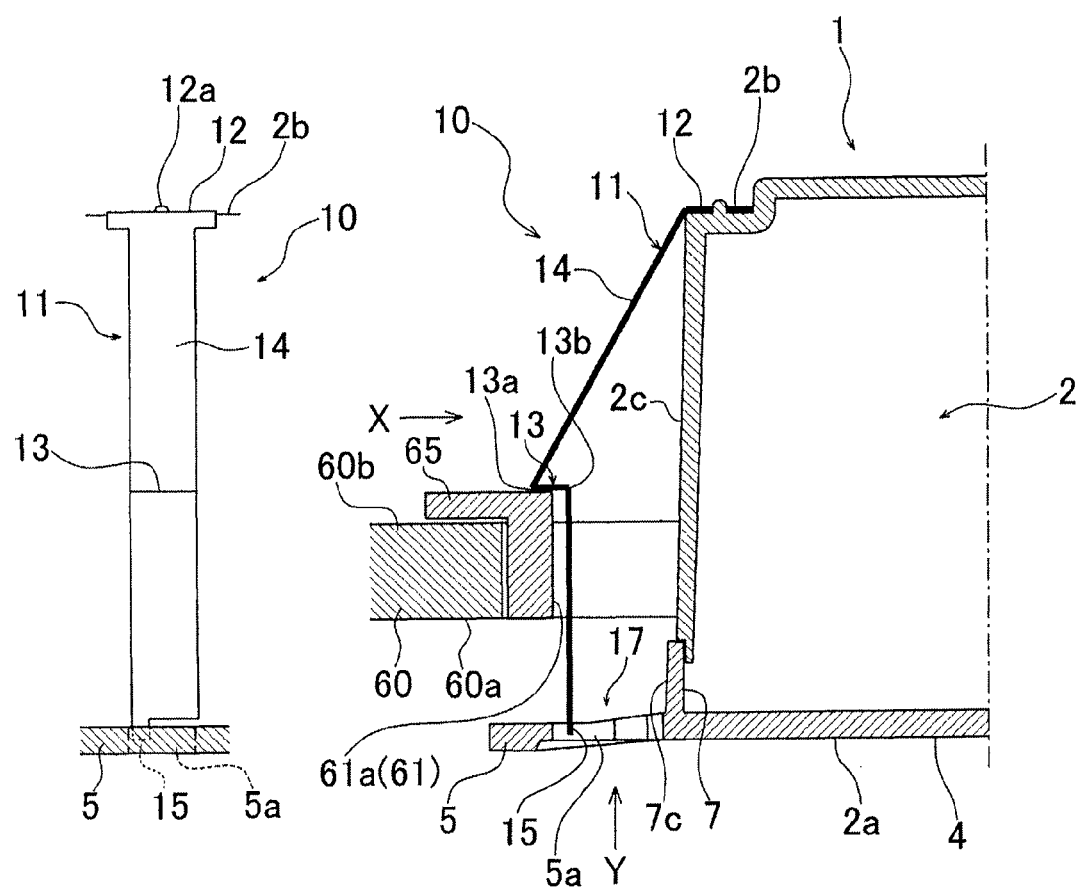
FIGS. 8A and 8B are a side sectional view and a side view, respectively, showing a modification of the operating section shown in FIGS. 3A and 3B.

Further, as shown in FIG. 3B, the operating section 15 has a width smaller than that of the engagement section 13 and the slant portion 14. Thus, the operating section 15 is manually operable more easily, so that operability of the provisionally fastening tab 11 can be enhanced. Further, in a case where the operating section 15 is provided to project to the face side (i.e., downwardly) beyond the speaker surface 4, the opening portion 5a and the retention section 17 can also be reduced in size if the operating section 15 is reduced in size. Thus, it is possible to minimize influence which the formation of the opening portion 5a would impart to quality of sound output from the speaker. Whereas the operating section 15 is provided to project to the face side beyond the speaker surface 4 in the instant embodiment, the present invention is not so limited, and the operating section 15 may be located in the opening portion 5a (i.e., disposed closer to the reverse side than the speaker surface 4, or disposed retracted from the speaker surface 4 in a direction toward the reverse side), as shown in FIGS. 8A and 8B, without projecting to the face side out of the opening portion 5a beyond the speaker surface 4.

Further, as shown in FIG. 3C, the retention section 17 comprises the retention groove 17a and the guide groove 17b formed, along the inner peripheral edge of the opening portion 5a, in such a manner that the retention groove 17a and the guide groove 17b together constitute a shape substantially similar to a laterally-inverted numeral "7" as viewed from the face side of the opening portion 5a. More specifically, the retention section 17 comprises: the guide groove 17b having a slant surface 17b1 slanting relative to a direction of movement (movement direction) D1 of the operating section 15; and the retention groove 17a communicating with the guide groove 17b and extending from the end of the guide groove 17b in a direction across or traversing the movement direction D1 of the operating section 15 (and hence the engagement section 13). For example, the retention groove 17a extends in a direction D2 generally perpendicular to the movement direction D1 of the operating section 15.

With such arrangements, as the human operator operates the operating section 15 in the movement direction D1 toward the cabinet section 2, the operating section 15 moves obliquely upward in FIG. 3C while being guided along the slant surface 17b1. The engagement section 13 too moves integrally with the operating section 15, which means that the movement direction of the engagement section 13 is displaced obliquely upward in FIG. 3C along the slant surface 17b1. Once the operating section 15 reaches the right end of the retention section 17, the operating section 15 moves downward in the direction D2 due to resiliency of the provisionally fastening tab 11 so that it is retained in the retention groove 17a.

Figure 4A:
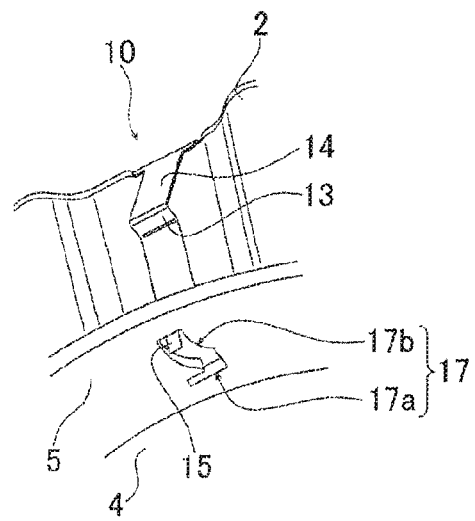
Figure 4B:
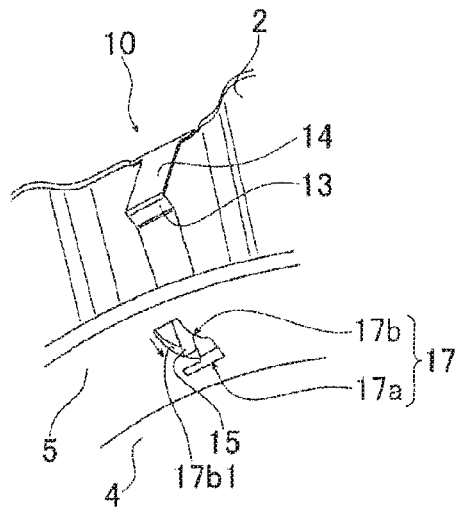
Figure 4C:
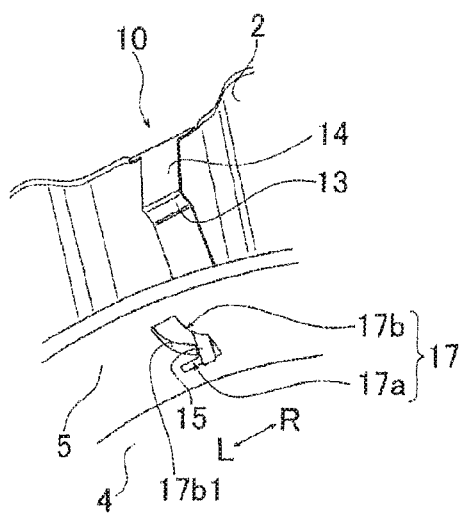
Figure 4D:
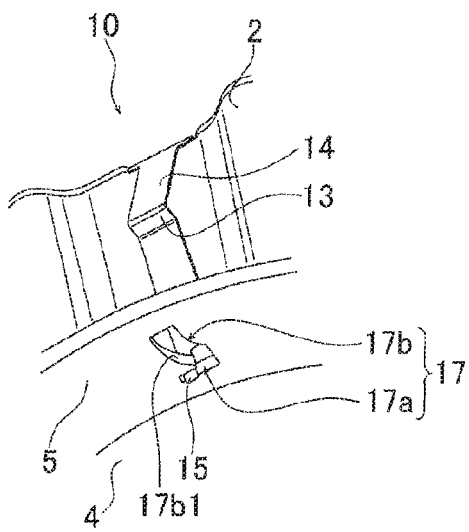

Now, behavior of the entire provisionally fastening tab 11 of the provisionally fastening mechanism 10 will be described in more detail with reference to FIGS. 4A to 4D. FIGS. 4A to 4D are perspective views of the provisionally fastening mechanism 10, of which FIG. 4A shows a state of the provisionally fastening mechanism 10 in which the engagement section 13 is in the engagement position where it engages with the mounting part 60, FIG. 4B shows a state of the provisionally fastening mechanism 10 in which the operating section 15 has abutted against the slant surface 17b1 of the guide groove 17b, FIG. 4C shows a state of the provisionally fastening mechanism 10 in which the operating section 15 has reached the retention groove 17a, and FIG. 4D shows a state of the provisionally fastening mechanism 10 in which the operating section 15 has been retained in the retention groove 17a with the engagement section 13 positioned in the cancellation position by being retracted or moved away from the mounting part 60. Note that illustration of the mounting part 60, the mounting hole 61, the attachment member 65, etc. is omitted for clearly showing the construction and behavior of the provisionally fastening mechanism 10.

When the engagement section 13 is in the engagement position where it engages with the mounting part 60, as shown in FIG. 4A, the operating section 15 is located in an outer portion of the guide groove 17b as viewed in a radial direction of the annular flange section 5. Further, as shown in FIG. 4B, as the operating section 15 is operated radially inward of the flange section 5, the engagement section 13 formed integrally with the operating section 15 moves toward the cabinet section 2 (i.e., radially inward of the flange section 5). At that time, the operating section 15 moves radially inward while being guided along the slant surface 17b1 formed on one side surface of the guide groove 17 so as to slant with respect to the movement direction of the operating section 15. Further, as shown in FIG. 4C, as the operating section 15 is pushed further radially inward in the retention groove 17, the engagement section 13 integral with the operating section 15 too moves away from the inner peripheral edge portion 61a of the mounting hole 61 toward the cabinet section 2, so that the engagement section 13 is placed in the cancellation position where it does not engage with the mounting part 60. In this cancellation position, the resilient provisionally fastening tab 11 has resiliently deformed after having moved rightward (in a direction of arrow R in FIG. 4C) along the slant surface 17b1, and thus, force is acting on the provisionally fastening tab 11 to restore the tab 11 leftward (in a direction of arrow L in FIG. 4C). Once the human operator releases, or lets go of, the operating section 15, the operating section 15 moves leftward by the restoring force accumulated in the provisionally fastening tab 11 as shown in FIG. 4D. Thus, the operating section 15 gets into the retention groove 17a to thereby be positioned (retained) in the retention groove 17a, with the result that the engagement section 13 of the provisionally fastening tab 11 is retained in the cancellation position where it is positioned closer to the cabinet section 2 than the inner peripheral edge portion 61a of the mounting part 61.

Figure 5A:
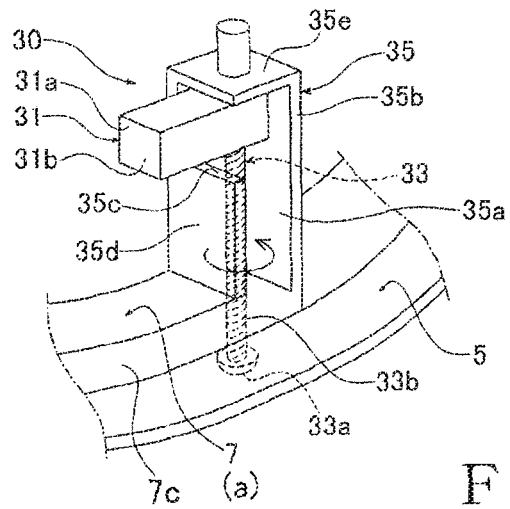
Figure 5B:
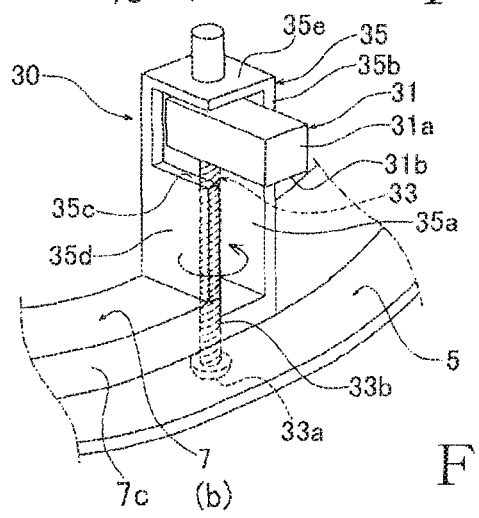
Figure 5C:
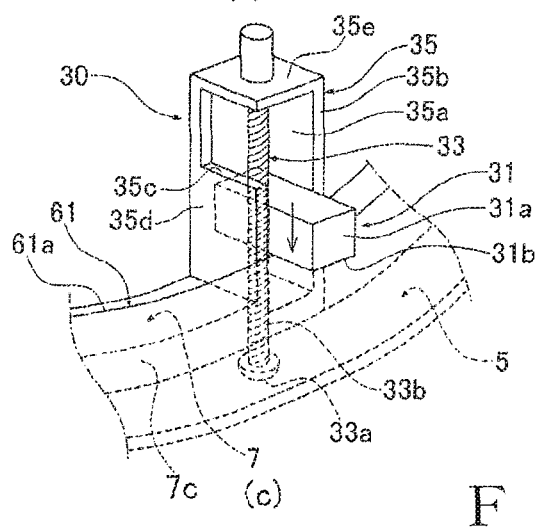

After the speaker unit 1 is provisionally fastened to the mounting part 60 using the above-described provisionally fastening mechanisms 10, it will be fully fastened through full fastening by the stopper mechanisms 30. A construction and behavior of each of the stopper mechanisms 30 at the time of such full fastening will be described with reference to FIGS. 5A to 5C. FIGS. 5A to 5C are schematic perspective views explanatory of a construction and behavior the stopper mechanism 30, of which FIG. 5A shows a state of the stopper mechanism 30 in which the stopper piece 31 is in an initial position, FIG. 5B shows a state of the stopper mechanism 30 in which the stopper piece 31 has pivoted from the initial position, and FIG. 5C shows a state of the stopper mechanism 30 in which the stopper piece 31 is in a fixed position. Note that, in FIGS. 5A to 5C, the stopper piece 31 is shown in a simpler shape than that shown in FIG. 1.

Each of the stopper mechanism 30 includes a frame section 35 rotatably supporting a screw shaft 33, and the stopper piece 31 of a generally columnar shape screwed on the screw shaft 33 and having a portion disposed within the frame section 35. The screw shaft 33 has a head portion 33a exposed on the bottom surface 2a of the speaker unit 1 (i.e., exposed on the same surface as the speaker surface 4), and a shaft portion 33b extending from the head portion 33a, through the bottom cover 7 and the interior of the frame section 35, to an upper wall 35e of the frame section 35 in an up-down direction along the axis of the shaft portion 33b. A thread groove is formed in the outer periphery of the shaft portion 33b. The shaft portion 33b has an upper end portion rotatably mounted to the upper wall 35e of the frame section 35. The screw shaft 33 is rotatable about its axis within the frame section 35 by the head portion 33a being rotated by means of a tool (not shown), such as a screw driver, from below the bottom surface 2a of the speaker unit 1. Further, the stopper piece 31 is screwed on the screw shaft 33 at its near-proximal-end portion, so that, as the screw shaft 33 is rotated, the stopper piece 31 is not only rotatable together with the screw shaft 33 within a plane parallel to the face side surface of the mounting part 60 but movable in the up-down direction relative to the screw shaft 33 through linear feeding by the screw. Further, the stopper piece 31 is movable between the interior of an opening 35a in the form of a vertical slit formed in the front surface of the frame section 35 and the interior of a recess 35c formed in an upper end portion of one side wall 35b of the frame section 35.

In the stopper mechanism 30 constructed in the aforementioned manner, as the screw shaft 33 is rotated in a counterclockwise direction as viewed from below (i.e., from the face side) when the stopper piece 31 is located at the uppermost end in the opening 35a, the stopper piece 31 pivots in the same direction to be located in the recess 35c as shown in FIG. 5A; such a position will be referred to as "initial position of the stopper mechanism 30". As the screw shaft 33 is rotated in the clockwise direction as viewed from below (i.e., from the face side) by the head portion 33a of the screw shaft 33 being rotated by means of a tool, such as a screw driver, from below the bottom surface 2a of the speaker unit 1 when the stopper mechanism 30 is in the initial position, the stopper piece 31 screwed on the screw shaft 33 pivots in the same direction. As shown in FIG. 5B, the stopper piece 31 abuts against the side wall 35b of the frame section 35 after having pivoted through 90° from the initial position in the counterclockwise direction as viewed from above (i.e., from the reverse side), so that further pivoting movement of the stopper piece 31 is restricted. Then, as the screw shaft 33 is further rotated in the clockwise direction, the stopper piece 31 moves downward toward the bottom cover 7 within the opening 35a until the lower surface 31b of the stopper piece 31 abuts against the inner peripheral edge portion 61a of the mounting hole 61 (reverse side surface 60b of the mounting part 60).

As the stopper piece 31 is further moved downward or lowered relative to the screw shaft 33, the position of the speaker unit 1 within the mounting hole 61 gradually moves upward relative to the mounting part 60. Ultimately, the inner peripheral edge portion 61a of the mounting hole 61 is sandwiched between the lower surface 31b of the stopper piece 31 and the flange section 5, so that the speaker unit 1 is fully fixed within the mounting hole 61. Such a position of the stopper mechanism 30 fully fixing the speaker unit 1 will be referred to as "fixing position of the stopper mechanism 30".

In order to cancel the fixation (full fixation), by each of the stopper mechanisms 30, of the speaker unit 1, the screw shaft 33 is rotated in the counterclockwise direction as viewed from below (from the face side) when the stopper mechanism 30 is located in the above-mentioned fixing position. Thus, the stopper piece 31 moves upward relative to the screw shaft 33, which cancels the sandwiching engagement of the inner peripheral edge portion 61a of the mounting hole 61 between the stopper piece 31 and the flange section 5. As the screw shaft 33 is further rotated in the clockwise direction as viewed from above (from the reverse side), the stopper piece 31 moves upward, in response to which the position of the speaker unit 1 within the mounting hole 61 gradually moves downward. Ultimately, the speaker unit 1 stops moving downward at a position where the engagement section 13 of the provisionally fastening tab 11 abuts against the reverse side surface 60b of the mounting part 60 (i.e., the inner peripheral edge portion 61a of the mounting hole 61). Then, as the screw shaft 33 is further rotated in the clockwise direction as viewed from above (from the reverse side), the stopper piece 31 moves up to the uppermost end of the opening 35a, after which the stopper piece 31 rotates in the counterclockwise direction as viewed from below (from the face side) to return to the initial position.

Next, a description will be given about an operational sequence for dismounting the speaker unit 1 from the mounting part 60 with reference to FIGS. 6A to 6C, of which FIG. 6A shows a state in which the engagement section 13 is in the engagement position, FIG. 6B shows a state in which the engagement section 13 is in the cancellation position and FIG. 6C shows a state in which the cabinet section 2 has been displaced downward away from the mounting part 60.

In the fully fixed state of the speaker unit 1, the cabinet section 2 is held pushed toward the reverse side (upper side) more strongly than in the provisionally fastened state of the speaker unit 1 shown in FIG. 3A. The full fixation can be canceled by the stopper piece 31 of the stopper mechanism 30 being returned from the fixing position back to the initial position in accordance with the aforementioned operational sequence. Even after such cancellation of the full fixation, the engagement section 13 still remains in the engagement position shown in FIG. 6A, and the speaker unit 1 still remains in the provisionally fastened state. Thus, in that state, the cabinet section 2 cannot be spontaneously or accidentally dismounted from the mounting hole 61. Here, as the operating section 15 is pulled in a direction of a white arrow in FIG. 6A, the engagement section 13 moves from the engagement position to the cancellation position. Further, once the engagement section 13 of each of the provisionally fastening mechanisms 10 is placed in the cancellation position with the operating section 15 retained by the retention groove 17*a* of the retention section 17 as shown in FIG. 6B, the provisionally fastening by the provisionally fastening mechanism 10 is canceled, which allows the speaker unit 1 to be dismounted from the mounting hole 61 of the mounting part 60. In this condition, the speaker unit 1 can be displaced downward from, i.e. pulled out of, the mounting hole 61 of the mounting part 60.

Figures 7A, 7B, 7C:
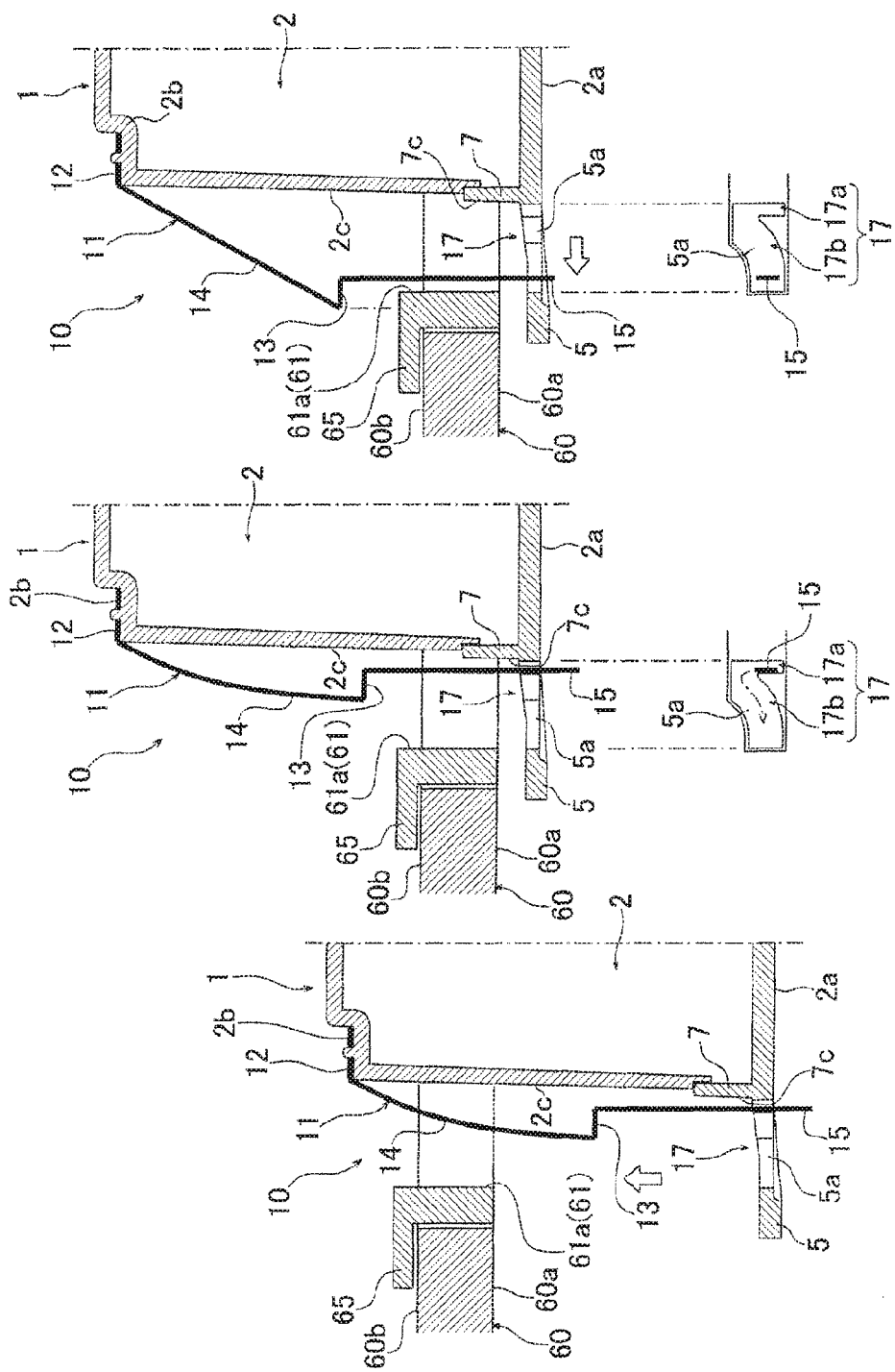

Now, an operational sequence for mounting the speaker unit 1 to the mounting hole 61 of the mounting part 60 will be described with reference to FIGS. 7A to 7C. FIG. 7A shows a state before the cabinet section 2 is mounted to the mounting part 60, FIG. 7B shows a state in which the engagement section 13 is in the cancellation position, and FIG. 7C shows a state in which the engagement section 13 has moved to the engagement position.

When the speaker unit 1 is to be mounted to the mounting hole 61 of the mounting part 60, the speaker unit 1 is moved so as to insert the cabinet section 2 into the mounting hole 61 of the mounting part 60, as shown in FIG. 7A. In this state, the engagement section 13 is retained in the cancellation position by the aforementioned retention section 17 (retention groove 17*a*). Then, as the cabinet section 2 is moved higher than the attachment member 65 as shown in FIG. 7B, the retention, by the retention section 17 (retention groove 17*a*), is canceled. Thus, the engagement section 13 is moved from the cancellation position to the engagement position as shown in FIG. 7C, so that the speaker unit 1 can be provisionally fastened to the mounting part 60. After the retention, by the retention sections 17, of all of the operating sections 15 (four operation sections 15 in the instant embodiment) is canceled, the speaker unit 1 can be fully mounted to the mounting part 60 by being fully fixed via the stopper mechanisms 30.

According to the preferred embodiment of the speaker unit 1, as described above, the provisionally fastening mechanism 10 includes: the engagement section 13 for provisionally fastening the speaker unit 1 to the mounting part 60; the operating section 15 exposed on the face side of the mounting part 60 with the speaker unit 1 provisionally fastened to the mounting part 60 via the engagement section 13; the non-shielded portion formed adjacent to the outer periphery of the speaker surface 4 to allow the operating section 15 to be visible from the face side of the speaker surface 4. As an example, the non-shielded portion may be, for example, the opening portion 5*a* or recess formed in the flange section 5 projecting radially outward from the outer circumferential or peripheral edge of the bottom surface 2*a* of the cabinet section 2.

Because the opening portion 5*a* is formed adjacent to the outer periphery of the speaker surface 4, the operating section 5 is visible from the face side of the speaker surface 4 through the opening portion 5*a*. Thus, when the speaker unit 1 is to be mounted or dismounted to or from the mounting part 60, the human operator can manipulate or operate the operating section 15 while viewing the provisionally fastening mechanism 10 from the face side of the speaker surface 4. In this way, there is no need for the human operator to grope for (feel for) the position of the provisionally fastening mechanism 10 when mounting or dismounting the speaker unit 1 to or from the mounting part 60, and thus, the human operator can easily cancel the provisional fastening of the speaker unit 1. Further, when the speaker unit 1 is to be dismounted from the mounting part 60, the human operator can access the operating section 15 through the opening portion 5*a* and thus can directly operate the operating section 15 from the face side of the speaker surface 4. In this manner, the human operator can operate the operating section 15 reliably irrespective of the thickness of the mounting part 60, and thus, the speaker unit 1 can be mounted and dismounted to and from the mounting part 60 with an increased ease and reliability.

Further, in the speaker unit 1, the operating section 15 may be constructed to project to the face side beyond the speaker surface 4. With the operating section 15 at the distal end of the engagement section 13 projecting to the face side beyond the speaker surface 4 like this, the human operator can operate the operating section 15 with an increased ease.

Further, in the speaker unit 1, the operating section 15 may be disposed retracted from the speaker surface 4 in a direction toward the reverse side of the mounting part 60 without projecting to the face side beyond the speaker surface 4. With the operating section 15 disposed retracted from the speaker surface 4 without projecting to the face side beyond the speaker surface 4 like this, a degree of structural and design freedom of elements around the speaker surface 4 can be enhanced.

Further, in the speaker unit 1, the retention section 17 is provided for retaining the operating section 15 in the opening portion 5*a*, and the engagement section 13 is movable between the engagement position in which it engages with the mounting part 60 and the cancellation position in which it cancels the engagement with the mounting part 60 by being retracted or moved away from the mounting part 60, and the retention section 17 may be constructed to retain the operating section 15 in the cancellation position of the engagement section 13 (i.e., when the engagement section 13 is in the cancellation position). Because the engagement section 13 can be retained in the cancellation position by the retention section 17 provided in the provisionally fastening mechanism 10, the operation for provisionally fastening the speaker unit 1 and canceling the provisional fastening of the speaker unit 1 at the time of mounting and dismounting of the speaker unit 1 to and from the mounting part 60 can be performed with an increased ease.

Further, in the speaker unit 1, the retention section 17 may be constructed to include the retention groove 17*a* for retaining the operating section 15 when the engagement section 13 is in the cancellation position, and the guide groove 17*b* for guiding therealong the movement of the engagement section 13 from the engagement position to the cancellation position. With such a groove structure of the retention section 17, the engagement section 13 can be directed smoothly to the cancellation position, so that dismounting of the speaker unit 1 from the mounting part can be performed with an increased ease.

Furthermore, in the speaker unit 1, the guide groove 17*b* may have the slant surface 17*b*1 slanting relative to the movement direction of the operating section 15, and the retention groove 17a may be formed to extend continuously from the end of the guide groove 17b in the direction generally perpendicular to the movement direction of the operating section 15. With the retention groove 17a having such a slant surface 17b1 slanting relative to the movement direction of the operating section 15, the operating section 15 is directed along the slant surface 17b1 in the direction slanting relative to the movement direction as the human operator moves the operating section 15 with a view to canceling the provisional fastening engagement with the mounting part 60. Because the retention groove 17a is formed to extend in the direction generally perpendicular to the movement direction of the operating section 15, the operating section 15 is retained by (in) the retention groove 17a once the operating section 15 shifts from the movement direction to the direction generally perpendicular to the movement direction. Because the retention section 17 can reliably retain the operating section 15, there is no need for the human operator to retain the operating section 15, which allows the human operator to perform the speaker unit dismounting operation even more easily and reliably.

Whereas the present invention has been described above in relation to the preferred embodiment, the present invention is not limited to the above-described embodiment and may be modified variously within the scope of the technical idea disclosed in the appended claims, the specification and the drawings. For example, the shapes and sizes of the guide and retention grooves of the retention section 17 and the opening portion 5a of the flange section 5 are not limited to those illustratively shown and described above in relation to the preferred embodiment. Further, the opening portion 5a need not necessarily be formed in the flange section 5 as long as the distal end of the engagement section 13 can be viewed by the human operator from the face side.

Further, whereas the preferred embodiment of the invention has been described above in relation to the case where the retention section 17 is formed as a peripheral edge of the opening portion 5a of the flange section 5, the present invention is not so limited as long as the retention section 17 is located in such a position where it is capable of limiting the movement of the engagement section 13. For example, the retention section 17 may be formed in the peripheral side surface 2c of the cabinet section 2 between the engagement section 13 of the provisionally fastening tab 11 and the operating section 15.

Further, whereas the preferred embodiment of the invention has been described above in relation to the case where the speaker unit 1 is mounted to the mounting hole 61 formed in the mounting part, such as a ceiling, the speaker unit 1 of the present invention may be mounted to other than the mounting part like a ceiling; for example, the speaker unit 1 of the present invention may be mounted by being embedded in a mounting hole formed in a vertical wall, a slanting wall.

Furthermore, the material, shape, size, etc. of the provisionally fastening tab (or provisionally fastening piece) 11 in the above-described preferred embodiment are only illustrative, and the provisionally fastening piece 11 in the present invention may be of any other material, shape, size, etc. than those illustratively shown and described in relation to the above-described preferred embodiment. For example, the provisionally fastening piece 11 may be formed of other than the above-mentioned resilient metal material, such as any one of various synthetic resin materials (e.g., plastic, ABS resin and acryl resin) and rubber materials, as long as the material of the provisionally fastening piece 11 has resiliency similar to leaf-spring-like resiliency. Further, the provisionally fastening piece 11 may be, for example, in the form of a bar rather than a thin plate-shaped piece as employed in the above-described preferred embodiment. Furthermore, the provisionally fastening piece 11 need not necessarily be a single integrally-formed piece as long as it has portions corresponding to the aforementioned engagement section and the operating section. For example, the engagement section, the operating section, the slant portion, etc. may be separate elements connected with one another and separable from one another as appropriate in response to an operation performed by the human operator on the operating section. Furthermore, where the provisionally fastening piece 11 is in the form of a single integrally-formed piece, the entirety of the single integrally-formed piece need not necessarily be constructed to be resiliently deformable and may be resiliently deformable only in part such that the engagement section can be shifted between the engagement position and the cancellation position.

Furthermore, the provisionally fastening piece 11 need not necessarily be constructed to be operated by being depressed by the human operator as described in the above-described preferred embodiment, and it may be constructed to be operated in any other desired manner; for example, it may be operated by being operated or moved toward the human operator or moved laterally.

Furthermore, whereas the preferred embodiment of the speaker unit 1 has been described above as containing various components or elements, such as a speaker driver, within the cabinet section 2, the speaker unit to be mounted to a mounting part, such as a ceiling or a wall, by use of the mounting structure of the present invention may be one that contains no components or just some components. Namely, the speaker unit including only the box-shaped cabinet section may be first mounted to an opening section of a ceiling or the like by means of the mounting structure of the present invention, and then, components of the speaker unit may be accommodated in the cabinet section.

This application is based on, and claims priority to, JP PA 2015-017993 filed on 30 Jan. 2015. The disclosure of the priority application, in its entirety, including the drawings, claims, and the specification thereof, are incorporated herein by reference.

What is claimed is:

1. A speaker unit for mounting to an opening section formed in a mounting part, the speaker unit comprising:
   a cabinet section having a side surface and a bottom surface;
   a speaker surface provided in the bottom surface of the cabinet section; and
   a provisionally fastening mechanism disposed on the side surface of the cabinet section and configured to provisionally fasten the speaker unit to the mounting part with at least a portion of the cabinet section inserted in the opening section from a face side of the mounting part, the provisionally fastening mechanism including:
      a resilient member having:
         an engagement section configured to provisionally support the speaker unit to the mounting part and movable between an engagement position where the engagement section engages with the mounting part and a cancellation position where the engagement section cancels engagement with the mounting part by being retracted from the mounting part; and
         an operating section provided at a distal end portion of the resilient member and exposed on the face side of the mounting part with the speaker unit provisionally fastened to the mounting part via the engagement section; and a retention section having a retention groove configured to retain the operating section so that the engagement section is retained in the cancellation position, and disposed adjacent to an outer periphery of the speaker surface for allowing the operating section to be visible from a face side of the speaker surface.

2. The speaker unit as claimed in claim 1, wherein:
the cabinet section has a flange section projecting radially outward from an outer peripheral edge of the bottom surface of the cabinet section, and
the flange section has an opening or recess.

3. The speaker unit as claimed in claim 1, wherein the operating section projects to the face side beyond the speaker surface.

4. The speaker unit as claimed in claim 1, wherein the operating section is disposed retracted from the speaker surface in a direction toward a reverse side of the mounting part without projecting to the face side beyond the speaker surface.

5. The speaker unit as claimed in claim 1, wherein in the cancellation position the operating section is retracted from the mounting part.

6. The speaker unit as claimed in claim 5, wherein the retention section further has a guide groove communicating with the retention groove and configured to guide movement of the operating section when the engagement section moves from the engagement position to the cancellation position.

7. The speaker unit as claimed in claim 6, wherein:
the guide groove has a slant surface configured to gradually displace a direction of movement, along the guide groove, of the operating section, and
the retention groove extends from an end of the slant surface in a direction traversing the movement direction of the operating section.

8. The speaker unit as claimed in claim 1, further comprising a fastening mechanism configured to fully fasten the speaker unit provisionally fastened to the mounting part by the provisionally fastening mechanism.

\* \* \* \* \*